July 16, 1929.  A. JENSEN  1,721,121
METHOD FOR RECONSTRUCTING LIQUID MIXTURES
Filed March 11, 1926  2 Sheets-Sheet 1

Inventor
Aage Jensen
by Percy B. Hills
Attorney

July 16, 1929.  A. JENSEN  1,721,121
METHOD FOR RECONSTRUCTING LIQUID MIXTURES
Filed March 11, 1926  2 Sheets-Sheet 2
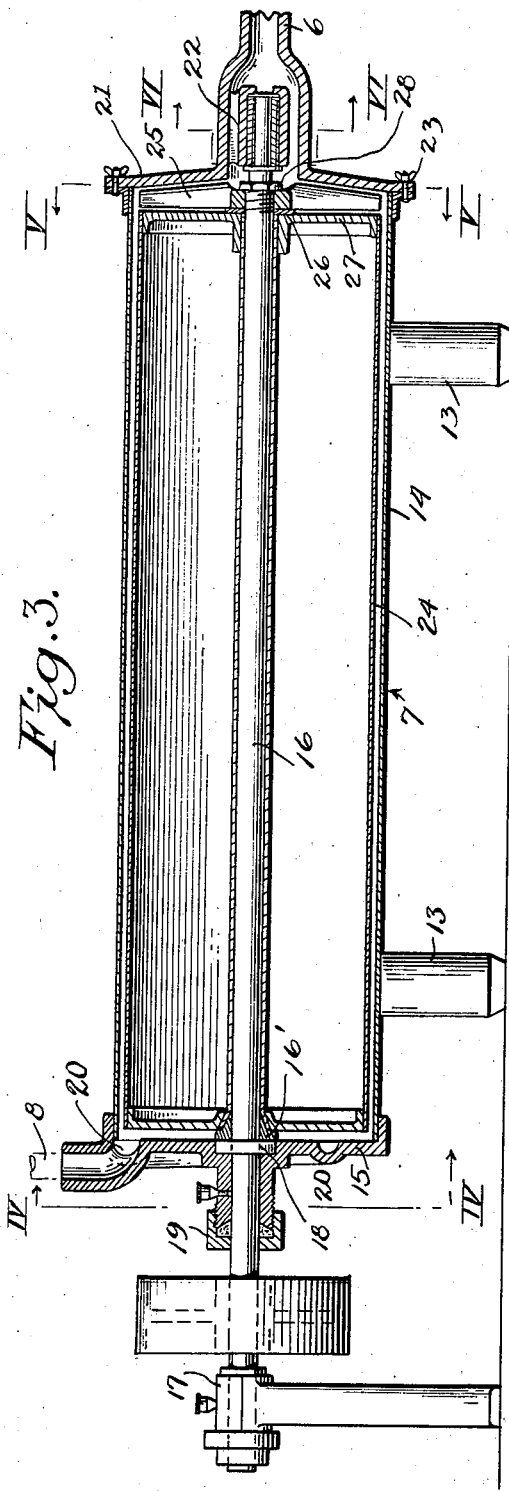
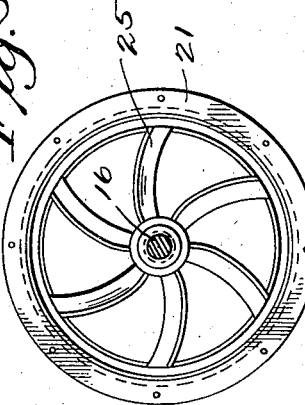
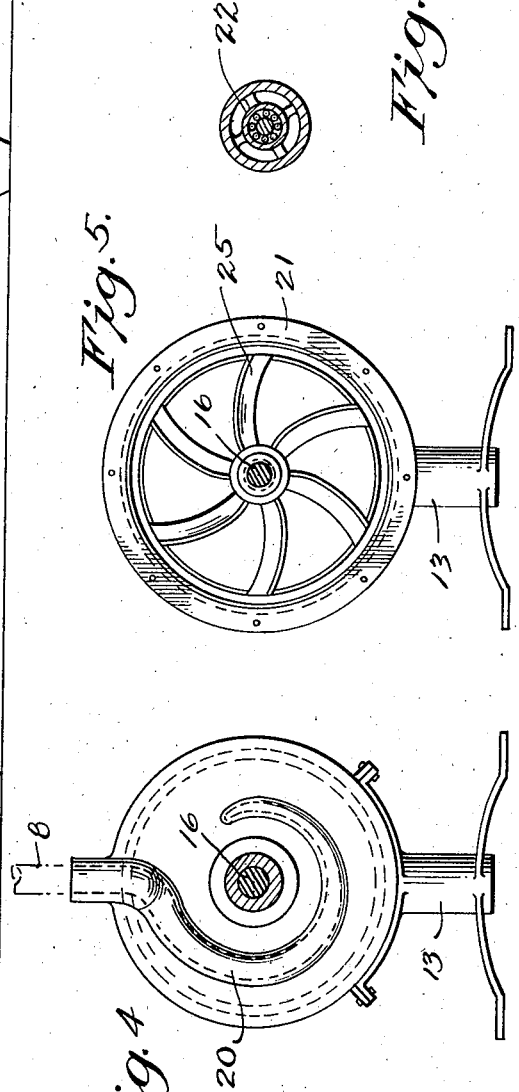
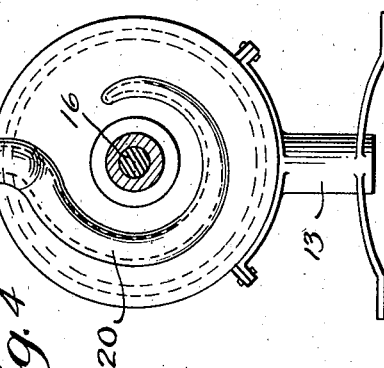

Patented July 16, 1929.

1,721,121

UNITED STATES PATENT OFFICE.

AAGE JENSEN, OF LOS ANGELES, CALIFORNIA.

METHOD FOR RECONSTRUCTING LIQUID MIXTURES.

Application filed March 11, 1926. Serial No. 93,912.

My invention relates to a process and apparatus to be used for reconstructing or mixing basic substances, such as are found in milk or other similar products. It can be used also in connection with other foods, or for industrial use.

Experience has taught that there occurs a constant separation of both butter oils and fats in milk and cream intended for domestic use. This condition is always objectionable, and is, therefore, an economic question, as it affects the quality of the finished material. The partial separation of fats results from numerous causes, the most common being that of excessive mechanical agitation which is often unavoidable. Other causes are rough handling during period of transportation of the raw material, and accidental freezing of the raw product, which often occurs during the winter months in certain producing sections. Partial separation also occurs during the process of pasteurization for various reasons, including over agitation. It also may be the result of germ development that has taken place in the raw product between the time produced and reaching the market. It is a harmful condition that all manufacturers wish to avoid.

In retail milk trade the term " cream plug " is used. It refers to a semi-solid mass forming on top of cans or bottles put up for distribution. It sometimes looks like heavy foam or at times it resembles curd or coagulation; but, in any event, it is objectionable from the consumers' standpoint. The " cream plug," upon closer analysis, is in reality a mixture of minute particles of floating fat and other milk solids.

In cheese making it is known that the separation of free floating butter fat invariably means a loss, for the reason that it will not re-combine with the other milk solids by the ordinary process of agitation employed in the manufacture of cheese.

In butter making the objection is even more pronounced and more common. One reason is excessive mechanical agitation attendant in cream production, starting with the cream separator, coolers and cans. It occurs during the period of transportation, or it may occur by freezing, or again it may develop in the receiving room of the plant.

My invention has demonstrated a further basic value in the handling of cream from which butter is manufactured intended for commercial use in territories where the climatic conditions are most unfavorable, and where the facilities for taking care of the same with refrigeration are not available. I refer in particular to the Tropics. It is of general commercial knowledge that butter sold in the Tropics or in the South, whether in tins, or in bulk, becomes exposed to high temperatures, causing the same to melt. The natural consequence that follows with ordinary butter is a separation of the ingredients, resulting in a layer of water and salt at the bottom, free fats in the center, and the curd and albuminous contents on top—a very objectionable condition.

With the use of my process this separation caused by melting is much less noted, as I find the curd and albuminous contents remain much more evenly distributed throughout the butter mass, which not alone prevents deterioration, both chemical and bacteriological, but also enhances the commercial value of the product. This improved condition results from the intimate location or fixing of the ingredients when using my process in treating the cream before churning.

The usual method employed in pasteurizing and preparing cream is by the use of large containers having helical coils or other forms of violent agitation. Nearly all of these devices introduce mechanical agitation that in itself tends to bring about separation of the fats, a condition that is harmful to the keeping quality, and, therefore affects the merchandising value of the same.

Other products similarly affected are: Cream, from which ice cream is made; margarine emulsions, mayonnaise; fruit emulsions; chocolate and malted milk, etc.

It is well understood that the more completely the various materials remain united in their correct location to each other, the better the finished product will be.

Coming back to butter fat. Authorities agree that butter oils are extremely sensitive to catalytic actions and oxidation. Thus, it will be seen that the free exposure of fats to the direct action of air and light rays hastens the breaking down of those valuable ingredients. My experiments in trying to stabilize the butter fat in cream, date back several years; its first inception following the introduction by me of a centrifugal sanitary milk pump for the handling of milk and cream in commercial plants. I also refer to U. S.

Patent No. 1,080,455, granted to me December 2, 1913. This improved device consists of a revolving cylindrical drum having an annular space in close proximity to a stationary cylinder. With this device I have been able to show greater improvements in the body structure of the products being pasteurized or cooled than with the apparatus formerly used.

This discovery led to further research for the purpose of demonstrating that not alone could I stabilize the particles of butter fat in cream or milk, but that I could actually incorporate an additional quantity of free fats beyond that normally found in those products. And I have now succeeded in demonstrating that this reincorporated fat will remain in a fixed position, the same as the normal fat already a constituent of same.

In more recent experiments I have shown that with the use of an improved type of this device I can take normal skim milk and add to same fluid butter fat, to make milk or cream of any desired richness, ranging all the way from 4% to 40% of butter fat. The reconstructed product can be used in coffee, made into ice cream or churned the same as normal cream. I have also demonstrated that this process is applicable to many other products of similar character to that of milk and cream.

I wish to explain that with the introduction of mechanical homogenization, fats can be incorporated with milk or other fluid substances, producing what is termed "homogenized cream"; but as this is done under extremely high pressure the physical structure of the fats and other materials become greatly altered. Therefore, the fats cannot again be separated except by chemical extraction; hence there are serious economical objections to this method where commercial milk, cream or similar products are treated.

In explaining what actually takes place with my invention, I have discovered that the reconstruction or fixing process takes place while the mixture containing the desired solids in fluid form are introduced and retained between smooth surfaces located in close proximity to each other; one of which is stationary and the other rapidly revolving, thus producing not only a counter-imposed friction, but at the same time introducing a rolling or fixing motion to the materials treated while progressively moving in a continuous helical forward motion. The forward motion may either be introduced by the centrifugal impeller, which shows as a part of this particular device, or it may be introduced through other means.

I have discovered that it is advantageous to introduce a progressive heating action to the liquid treated, primarily for the purpose of insuring a true mixture, something that is essential where the treatment of butter fat is concerned; and that the greatest benefit is obtained when the reconstructed product is cooled immediately in a similar device. The advantage of this latter and very essential step is further explained when it is known that butter fat in milk or cream reaches its melting point at around 98° F., meaning that it is in a complete liquid state. Between the temperature range from 98° to 75° F. butter fat is known to undergo a congealing action, being neither liquid nor solid, and not until it reaches a temperature of below 75° does it permanently solidify. Thus it will be seen that my process introduces progressive fixed physical locations of the fats in relation to the other solids, starting with free fluid fats and finishing as a permanently solid constituent, located in its natural position.

In the accompanying drawings:

Figure 3 is an enlarged detail longitudinal sectional view taken through my improved reconstructor.

Figure 4 is a transverse section taken on the line IV—IV of Figure 3.

Figure 5 is a section taken on the line V—V of Figure 3.

Figure 6 is a section taken on the line VI—VI of Figure 3.

Similar numerals of reference denote corresponding parts in the several views.

Figure 1:
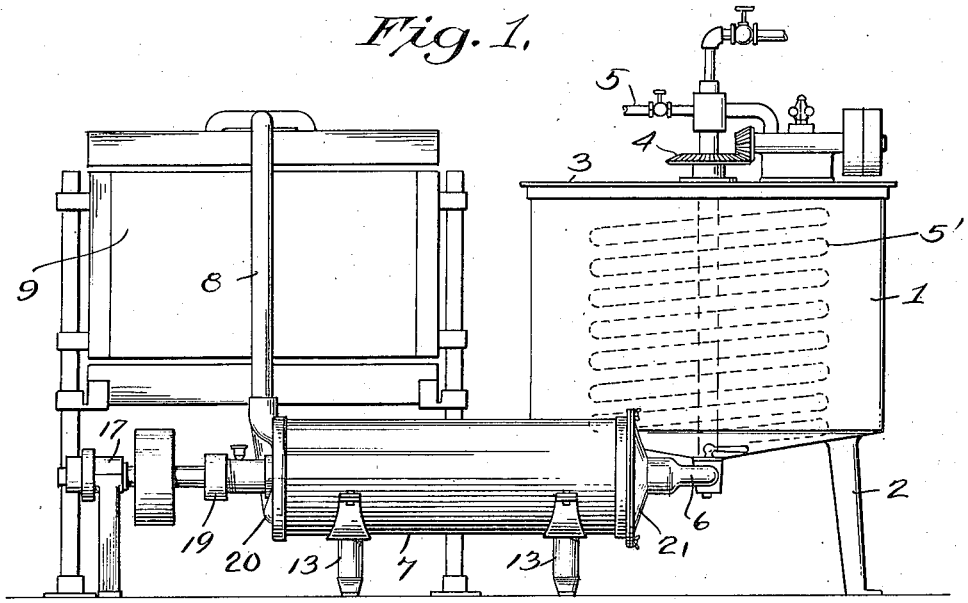
Figure 1 is a side elevation of a complete assembly including my improved reconstructor, a tempering supply tank and a cooler, the two latter being of conventional construction.
Figure 2:
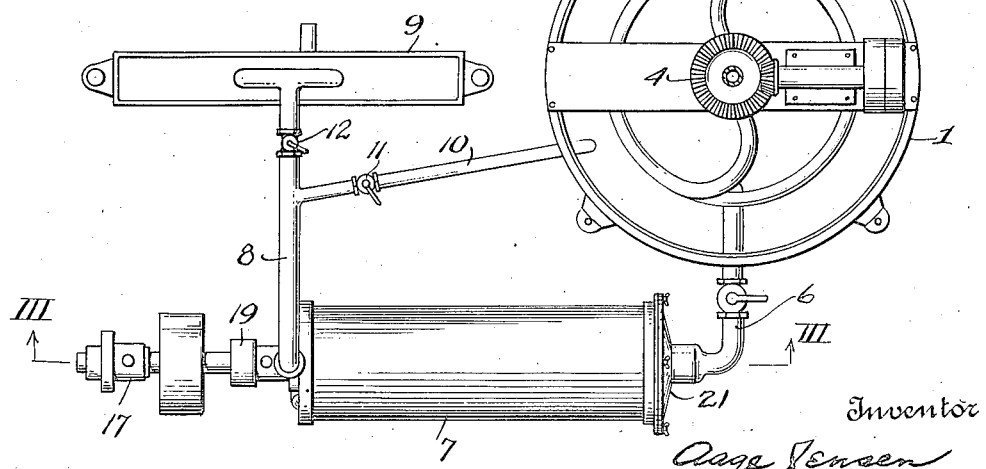
Figure 2 is a top plan view of the same.

In the said drawings, referring more particularly to Figures 1 and 2, the reference numeral 1 denotes a conventional heating and mixing tank, into which the materials to be treated are to be introduced, the same being supported upon legs 2, and having a cover 3 through which passes a central vertical shaft operated by gearing 4 from any suitable source of power. Steam is admitted through pipe 5 to the rotatable heating coils 5′ in the tank, said coils being operated through the central shaft and the gearing 4. Leading from the bottom of said tank is a pipe 6 enlarged at its outer end and connected with or formed integral with the head 21 of my improved reconstructor 7. Leading from the head 15 at the opposite end of said reconstructor is a pipe 8, which discharges into the top of a conventional cooler 9. Tapped into said pipe 8 and leading back to the tank 1 is a by-pass pipe 10, suitable valves 11 and 12 in said pipes 10 and 8 providing for directing the flow of the liquid as hereinafter described. The reconstructor 7 is supported upon suitable legs 13 and consists of an outer casing 14 having fixed thereto at one end the head 15, said casing having passing centrally and longitudinally therethrough a shaft 16 supported at one end by bearings 17 and having thereon a thrust collar 18 adapted to engage the head 15 to keep said shaft in position while in operation, a suitable stuffing box 19 being provided to prevent leakage. The head 15 is formed with a helical recess 20, gradually increasing in cross area from its inner end outward, into which the discharge pipe 8 is connected, for the purpose of carrying off the treated liquid. At its other end the reconstructor is provided with the head 21 having a stationary bearing 22 therein to support the other end of said shaft 16, said head being removable and being retained in position by suitable fasteners 23, a gasket being interposed to provide a sealed joint.

Mounted on and fixed to the shaft 16 is a rotatable drum 24 designed to withstand rapid rotation, said drum being spaced from the casing 14, as shown, and being removable from said casing whereby it may be replaced by another and similar drum to vary the space between the same and the casing 14 in accordance with the requirements of different liquids to be treated. Said drum is retained in position in fixed relation to the shaft 16 by abutting against a conical collar 16′ which in turn abuts the thrust collar 18, and is fixed to said shaft 16. Said drum is forced into contact with the collar 16′ by the hub of an impeller 25 at its opposite end, said hub being in threaded engagement with the shaft 16 and exerting its pressure against a washer 26 interposed between the same and the head 27 of the drum 24 at that end. If desired, a nut 28 may be placed in screw-threaded engagement with the hub of said impeller still further to tighten the same.

In operation, the liquid to be treated, and the constituents to be incorporated therewith, are supplied to the drum 1 and the heating coil therein set in motion through the gears 4 thoroughly to agitate and heat the same. The valve and pipe 6 being open and the drum 24 being rotated by the rotation of the shaft 16, the impeller 25 will draw the liquid into the casing 14 and forcibly impel it longitudinally of said casing in the space between the same and said drum 24. The action of the rapid revolving drum 24 in connection with the stationary casing 14 produces a counter-imposed friction upon the liquid being treated, and at the same time introduces a rolling or fixing motion to said liquid while progressively and continuously moving it helically forward toward the discharge end. At the beginning of the operation, the valve 12 in pipe 8 leading to the cooler 9 is closed and the valve 11 in by-pass pipe 10 opened, whereby the liquid will circulate back to the tank 1, which action is continued until the proper degree of heat is obtained, whereupon valve 11 is closed and valve 12 opened, so that the flow will be to the cooler 9.

The receiving tank 1 may be of any conventional construction, and a suitable form is illustrated in Letters Patent No. 924,233, granted to me June 8, 1909. So also the cooler 9 may be of the type illustrated in Letters Patent, No. 1,073,989, granted to me September 23, 1913. And I also contemplate providing a water or steam jacket for the reconstructor 7, as disclosed in my said Letters Patent, No. 1,080,455, as it has been found desirable, in the treatment of many liquids, to continue the heating of the same while being subjected to the action of the reconstructor.

Having thus fully described my invention, what I claim as new and desire to secure by Letters Patent, is:—

1. The method of relocating separated substances in liquids, which consists in passing them, when brought together, between a stationary and a rotating elongated surface located in close proximity to each other but not in sufficiently close proximity to effect a homogenizing action.

2. The method of reconstructing milk solids with fats other than milk fats, so as to resemble milk or cream, which consists in passing them, when brought together, between an elongated stationary and an elongated rotating surface located in close proximity to each other but sufficiently spaced apart to prevent the development of any substantial pressure upon the solids and fats.

3. The method of emulsifying solids or semi-solid substances with liquids, which includes introducing a fluid mixture of liquids and normally solid or semi-solid substances between relatively rotating closely adjacent elongated cylindrical surfaces.

4. The method of emulsifying solids or semi-solid substances with liquids, which includes introducing a fluid mixture of liquids and normally solid or semi-solid substances between relatively rotating closely adjacent surfaces, the initial temperature of the mixture being above the melting point of the solid substances, and progressively cooling said mixture during continued passage between said surfaces until the temperature is below that at which said normally solid substance will solidify.

5. The method of emulsifying solids or semi-solid substances with liquids, which includes introducing a fluid mixture of liquids and normally solid or semi-solid substances between elongated, relatively rotating, closely adjacent surfaces, and progressively varying the temperature of said mixture during its continued passage between said surfaces.

In testimony whereof I hereunto affix my signature.

AAGE JENSEN.